US009823730B2

(12) United States Patent
Kanchana et al.

(10) Patent No.: US 9,823,730 B2
(45) Date of Patent: Nov. 21, 2017

(54) POWER MANAGEMENT OF CACHE DUPLICATE TAGS

(71) Applicant: Apple Inc., Cupertino, CA (US)

(72) Inventors: Muditha Kanchana, San Jose, CA (US); Erik P. Machnicki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 14/793,778

(22) Filed: Jul. 8, 2015

(65) Prior Publication Data

US 2017/0010655 A1    Jan. 12, 2017

(51) Int. Cl.
G06F 1/32     (2006.01)
G06F 12/0813  (2016.01)
G06F 12/0831  (2016.01)
G06F 12/0817  (2016.01)

(52) U.S. Cl.
CPC ........ *G06F 1/3275* (2013.01); *G06F 12/0813* (2013.01); *G06F 12/0822* (2013.01); *G06F 12/0831* (2013.01); G06F 2212/1016 (2013.01); G06F 2212/1028 (2013.01); G06F 2212/314 (2013.01); Y02B 60/1228 (2013.01); Y02B 60/32 (2013.01)

(58) Field of Classification Search
None
See application file for complete search history.

(56) References Cited

U.S. PATENT DOCUMENTS

| 5,706,463 | A | * | 1/1998 | Ebrahim | ............. G06F 12/0822 |
|---|---|---|---|---|---|
| | | | | | 711/120 |
| 7,752,474 | B2 | | 7/2010 | Keller et al. | |
| 2011/0185126 | A1 | | 7/2011 | Sasaki et al. | |
| 2014/0095794 | A1 | | 4/2014 | Moses | |
| 2014/0095801 | A1 | | 4/2014 | Crawford | |
| 2014/0189411 | A1 | | 7/2014 | Kanchana et al. | |

(Continued)

OTHER PUBLICATIONS

Mittal, Sparsh, Zhao Zhang, and Jeffrey S. Vetter. "FlexiWay: A cache energy saving technique using fine-grained cache reconfiguration." Computer Design (ICCD), 2013 IEEE 31st International Conference on. IEEE, 2013.*

*Primary Examiner* — Charles Rones
*Assistant Examiner* — Hewy Li
(74) *Attorney, Agent, or Firm* — Meyertons, Hood, Kivlin, Kowert & Goetzel, P.C.; Erik A. Heter

(57) ABSTRACT

A method and apparatus for power management of cache duplicate tags is disclosed. An IC includes a cache, a coherence circuit, and a duplicate tags memory that may store duplicates of the tags stored in the cache. The cache includes a number of ways that are separately and independently power controllable. The duplicate tags memory may be similarly organized, with portions that are power controllable separately and independently of others. The coherence circuit is also power controllable, and may be placed into a sleep mode when idle. The IC also includes a power management circuit. During operation, the cache may change power states and provide a corresponding indication to the power management circuit. Responsive to the indication, the power management circuit may awaken the coherence circuit if in a sleep state. The coherence circuit may then power manage the duplicate tags in accordance with the change in power state.

20 Claims, 5 Drawing Sheets

(56) References Cited

U.S. PATENT DOCUMENTS

| | | | | |
|---|---|---|---|---|
| 2014/0215252 A1* | 7/2014 | Fullerton | .................. | G06F 1/00 |
| | | | | 713/324 |
| 2014/0379975 A1* | 12/2014 | Ikegami | ............. | G11C 14/0081 |
| | | | | 711/104 |
| 2015/0089261 A1* | 3/2015 | Segawa | ................ | G06F 1/3296 |
| | | | | 713/322 |

\* cited by examiner

POWER MANAGEMENT OF CACHE DUPLICATE TAGS

BACKGROUND

Technical Field

This disclosure is directed to processors for computer systems, and more particularly, the management of duplicate cache tags in a computer system.

Description of the Related Art

Many computer systems include multiple processors or processor cores that share one or more cache memories. Each of the various processors/cores may modify data stored in the various shared cache memories. Since some of the data stored in the different caches may be associated with a same memory address, it is possible that different processors may at times modify what is essentially the same data. Accordingly, such computer systems may include mechanisms to maintain cache coherence, i.e. to make sure that the most up to date copy of a particular piece of data stored in a cache is available.

Some computer systems (or systems on a chip, SoC's) implement cache coherency circuitry to maintain cache coherence. The cache coherence circuitry may track the data that is stored in the various caches and may ensure that the most up to date copies are available for use by the processors and/or other clients that may access the caches. A duplicate tags memory may also be provided to store duplicates of the tags associated with the data stored in the cache (as well as other information, such as whether data is dirty). The cache coherence circuitry may access the duplicate tags memory to determine the states of the data stored in the various shared caches and to perform the functions that allow the maintaining of cache coherency.

SUMMARY

A method and apparatus for power management of cache duplicate tags is disclosed. In one embodiment, an integrated circuit (IC) includes a cache memory, a coherence circuit, and a duplicate tags memory. The duplicate tags memory may store duplicates of the tags stored in the cache. The cache memory may include a number of ways that are separately and independently power controllable. The duplicate tags memory may be similarly organized, with portions that are power controllable separately and independently of others, and which correspond to ways of the cache memory. The coherence circuit is also power controllable, and may be placed into a sleep mode when idle. The IC also includes a power management circuit. During operation, the cache may change power states, and may provide a corresponding indication to the power management circuit. Responsive to the indication, the power management circuit may awaken the coherence circuit if in a sleep state. The coherence circuit may then power manage the duplicate tags in accordance with the change in power state of the cache memory.

The power management circuit may place the coherence circuit in the sleep mode after the coherence circuit has ensured coherence of the data stored in the cache. That is, the coherence circuit may ensure that all data stored in the cache is up to date. Once coherence is established, the power management circuit may place the coherence circuit into the sleep mode by performing clock gating, power gating, or both.

BRIEF DESCRIPTION OF THE DRAWINGS

The following detailed description makes reference to the accompanying drawings, which are now briefly described.

Figure 1:
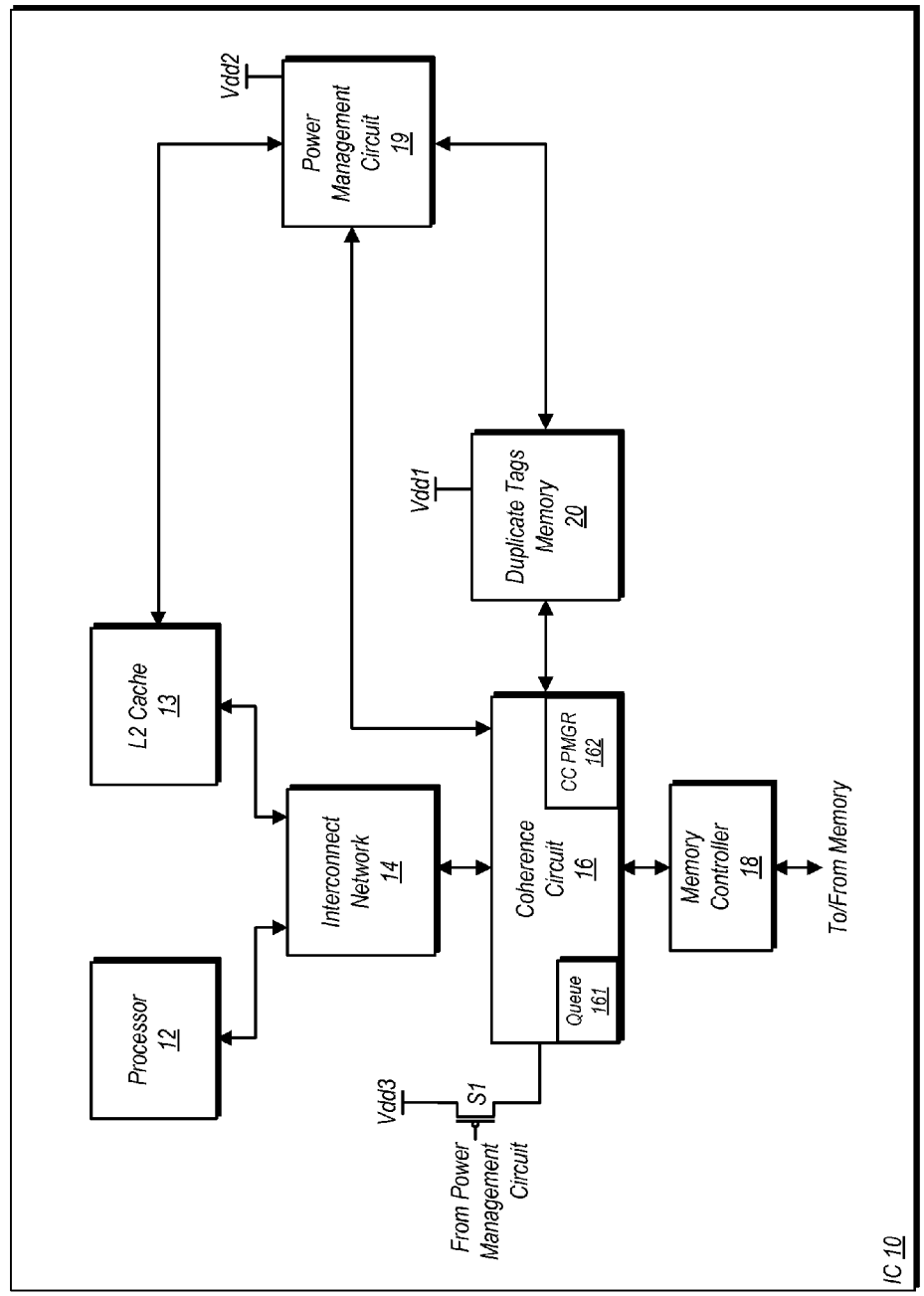
FIG. 1 is a block diagram of a system on a chip (SoC).

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION OF EMBODIMENTS

Turning now to FIG. 1, a block diagram of one embodiment of an IC is shown. It is noted that IC 10 as shown here is exemplary and is not intended to limit the scope of this disclosure. Furthermore, while some connections between the various functional circuit blocks are shown, such illustration is not intended to construe that all possible connections are shown. On the contrary, additional interconnections may be present even though not explicitly discussed herein.

In the embodiment shown, IC 10 is a system-on-a-chip (SoC) including at least one processor cores 12. Embodiment of IC 10 implemented having multiple instances of processor core 12 are possible and contemplated. IC 10 also includes a level two (L2) cache 13, which may be used to store data and instructions for processor core 12 (and may be shared by multiple instances of processor core 12, if present). It is noted that while the present disclosure utilizes the example of an L2 cache, these embodiments are not intended to be limiting. L2 cache 13 may include a number of entries, each of which stores a copy of data from a lower level memory (e.g., main memory). As will be discussed below, L2 cache 13 may include a number of ways, and may be implemented using various levels of associativity (e.g., set associative, fully associative).

IC 10 in the embodiment shown includes a power management circuit 19 which may perform various power control functions. Such power control functions include power gating of various functional circuit blocks (i.e., removing power from a circuit block when idle), clock gating of functional circuit blocks (i.e., inhibiting clock signal from being provided to a circuit block when idle), voltage scaling (i.e., increasing or reducing the supply voltage provided to a circuit block), and frequency scaling (i.e., increasing or reducing the frequency of a clock signal provided to a circuit block). Although not explicitly shown, IC 10 may also include one or more temperature sensors from which power management circuit 19 receives temperature reading and performs thermal control actions based thereon. Additionally, in some embodiments, power management circuit 19 may perform workload allocation functions, e.g., moving some processing workload from one processor core 12 to another, in order to balance power use, thermal output, or for other reasons.

IC 10 also includes a coherence circuit 16 and a memory controller 18, the former being coupled to the L2 cache 13 and processor 12 via an interconnect network 14. Interconnect network 14 in the embodiment shown is an on-chip network for connecting the various components of IC 10 to one another. Implementation of interconnect network 14 may be through a communications fabric, a crossbar switch, one or more buses, or any other suitable mechanisms for coupling the various components of IC 10 to each other.

Memory controller 18 in the embodiment shown is coupled between a coherence circuit 16 and a main memory (not shown). Accesses to and from the main memory by the various agents of IC 10 may be routed through memory controller.

Coherence circuit 16 in the embodiment shown is responsible for maintaining cache coherence among the various caches of IC 10, including L2 cache 13. It is noted that IC 10 may include additional caches, such as L1 caches in processor core 12 and at least one L3 cache. In some embodiments, multiple L2 caches may be implemented, while embodiments having multiple processor cores 12 may thus have multiple instances of an L1 cache. Not all caches possible are not shown here for the sake of simplicity, although they may nevertheless be present in various embodiments. Cache coherence may be defined herein as ensuring that the most recent copy of a given piece of data is stored in the various levels of cache. To this end, cache coherence circuit 16 may cause a write back to memory of data that has been modified subsequent to its being loaded in a given cache (often referred to as 'dirty' data, and indicated by the setting of a dirty bit).

Coherence circuit 16 in the embodiment shown includes a queue 161, which is configured to store information regarding pending transactions. The queue may be implemented in various forms, e.g., as a first-in, first-out (FIFO) queue or other suitable mechanism.

In the embodiment shown, IC 10 includes a duplicate tags memory 20, which stores duplicates of the tags stored in L2 cache 13. Each entry L2 cache 13 is associated a tag which identifies the data in the backing store (e.g., its location in main memory) which is copied in the respective entry. Additional information may also be associated with each entry in L2 cache 13, such as dirty bits that indicate that the data in a particular entry has been modified relative to its state when originally loaded from the lower level memory. Duplicates of these tags may be stored in duplicate tags memory 20. Whenever tags in L2 cache 13 are updated, logic within the cache may forward the duplicates of the updated tags to coherence circuit 16, which may then forward them to duplicate tags memory 20.

The storing of the duplicate tags may enable the coherence circuit 16 determine when updates to data stored in the cache have occurred. Instead of snooping the caches periodically, information indicative of updates may be provided to coherence circuit 16, by L2 cache 13, via interconnect network 14. Coherence circuit 16 may then perform actions to establish cache coherence. As noted above, cache coherence may defined herein as ensuring that the various caches in the system (such as L2 cache 13) are storing the most recent copy of a given piece of data, and further, to ensure that main memory is also storing the most recent copy of the data. Thus, coherence circuit 16 may maintain or verify cache coherence without being required to access the caches directly, thus preserving bandwidth.

The utilization power management circuit 19 may also enable the realization of some power savings, including power savings from shutting down coherence circuit 16. As shown in FIG. 1, coherence circuit 16 is connected to its power source, Vdd3, via a power switch S1 (shown as a single transistor this embodiment, but may comprise multiple transistors). During times of idleness, it may be desirable to power down coherence circuit 16. Power management circuit 19 may deactivate switch S1 to remove power from coherence circuit 16.

Clock-gating may also be performed to reduce power consumption by coherence circuit 16. Although the connections are not shown here, power management circuit 19 may be coupled to operate a clock gating circuit to inhibit a clock signal from being provided to coherence circuit 16. In some embodiments, coherence circuit 16 may initially be placed into a sleep mode by performing clock gating, followed by power gating if no intervening activity causes a wake up of the circuit. Accordingly, a sleep mode may be defined herein as performing clock gating of a circuit, power gating of the circuit, or both.

In the embodiment shown, coherence circuit 16 includes a coherence circuit power manager 162 (hereinafter 'power manager 162'). The functions performed by power manager 162 include the generation of requests to place coherence circuit 16 into a sleep mode. For example, if queue 161 is empty, power manager 162 may provide an indication to power management circuit 19 that it is idle and ready to be placed into a sleep mode. If transactions are present in queue 161, coherence circuit 16 may first handle each of the pending transactions, thereby draining the queue, before requesting to be placed into a sleep mode.

In addition to generating requests to place coherence circuit 16 into a sleep mode, power manager 162 may also perform power management functions for duplicate tags memory 20. As will be discussed below, L2 cache 13 includes a number of ways that are separately and independently power controllable (i.e., may be powered up or down independently of other ways). The structure of duplicate tags memory 20 may include portions that are similar to L2 cache 13 in that they are separately and independently power controllable. At times during operation of IC 10, particular ways of L2 cache 13 may be powered down, thereby obviating the need to store duplicates of the tags for that way. Accordingly, when a given way of L2 cache 13 is powered down, power manager 162 may respond by powering down the corresponding portions of duplicate tags memory 20 that previously stored tags for the way that is now powered down. Prior to powering down the corresponding portions, any duplicate tags stored therein may first be invalidated. Conversely, if a given way of L2 cache 13 transitions to a state of being powered up, power manager 162 may also power up the corresponding portions of duplicate tags memory 20.

Although coherence circuit 16 may be placed into a sleep mode, portions of duplicate tags memory 20 may remain active in accordance with the ways of L2 cache 13 that are also powered down. Nevertheless, the power state of L2 cache 13 may change while coherence circuit 16 is in a sleep mode, and this can affect the status of duplicate tags stored in duplicate tags memory 20. When the power state of L2 cache 13 changes (i.e., ways powered up, ways powered down, or both), it may convey information regarding the power state change to power management circuit 19. At some point thereafter, power management circuit 19 may awaken coherence circuit 16 and transmit thereto information regarding the power state change. Upon being awakened, coherence circuit 16 may power manage the duplicate tags (and therefore, duplicate tags memory 20) by updating any tags accordingly. The power state of the duplicate tags memory 20 is also updated in accordance with the change in power state of L2 cache 13. If there are no pending transactions following these updates, power manager 162 may generate a request to power management circuit 19 to be returned to the sleep mode.

In the embodiment shown, both duplicate tags memory 20 and power management circuit 19 receive power from sources Vdd1 and Vdd2, respectively. These two units are "always on" units, i.e. they remained powered on during times IC 10 is in operation, although portions of duplicate tags memory 20 may be powered down as noted above. Coherence circuit 16, which as noted above, may be power gated during times of inactivity. Although not explicitly shown, other units of IC 10, such as processor cores 12, may also be power gated.

The scheme described above may allow for significant power savings while also avoiding at least some of the performance penalties upon wakeup from an idle state. Power savings may be realized by powering down coherence circuit 16 when no transactions affecting cache coherence are pending. Similarly, powering down selected ways of l2 cache 13 and corresponding portions of duplicate tags memory 20 may also realize some power savings. However, maintaining portions of duplicate tags memory 20 as powered on while storing valid tags may reduce performance penalties upon wakeup of coherence circuit 16 relative to a situation in which the duplicate tags had to be re-stored. In the apparatus described above, the only duplicate tags updates upon waking coherence circuit 16 are those associated with the power state change of L2 cache 13 that occurred while coherence circuit 16 was in the sleep mode.

Figure 2:
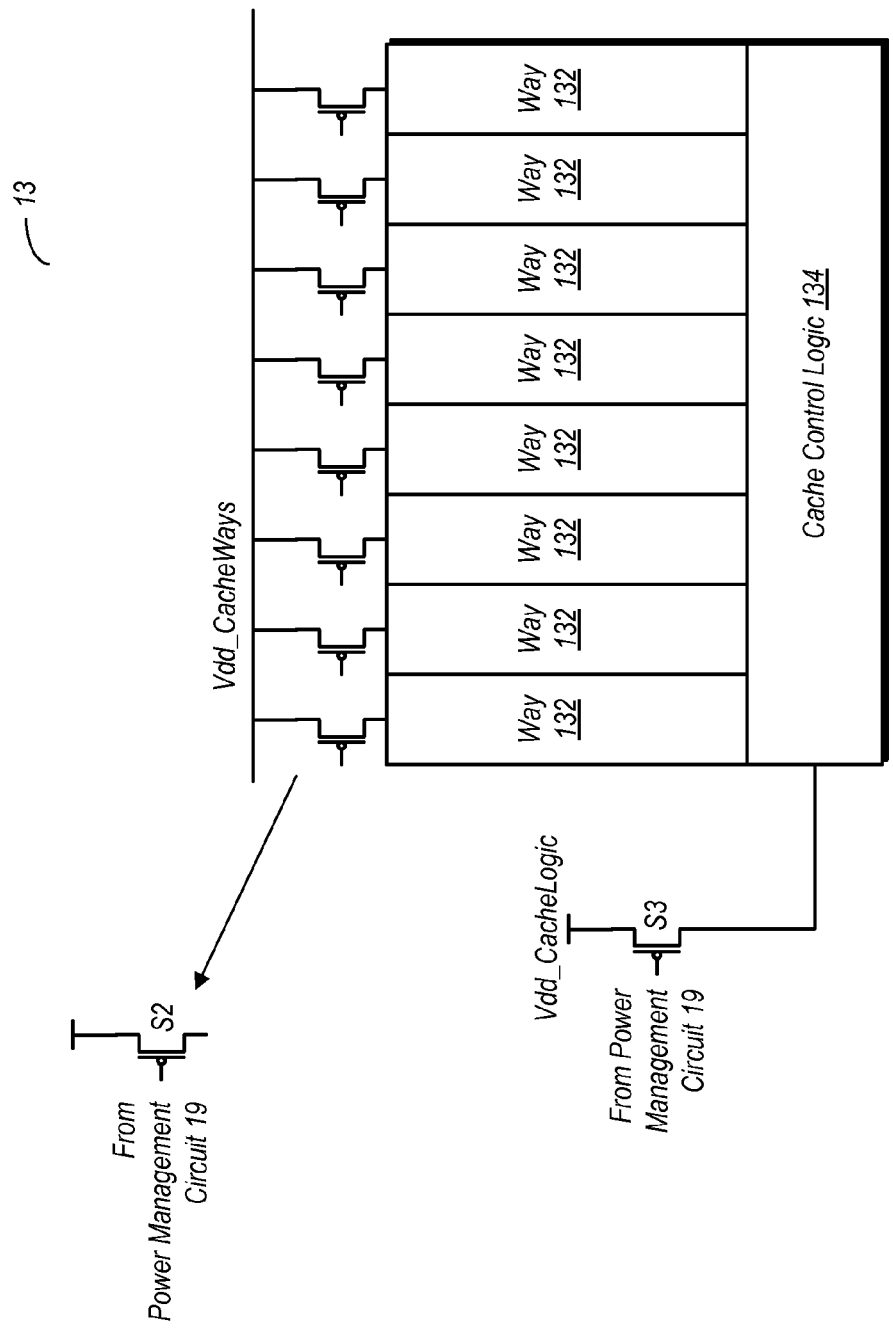
FIG. 2 is a diagram of one embodiment of a cache having ways that are independently power controlled.

Turning now to FIG. 2, a diagram of one embodiment of a cache having ways that are independently power controlled is shown. In the embodiment shown, L2 cache 13 includes a number of ways 132 and cache control logic 134. Each cache way it coupled to receive power from the Vdd_CacheWays via a corresponding power switch S2. Each of the power switches S2 is separately and independently controllable by power management circuit 19. Accordingly, each of the ways 132 may be powered up or down separately and independently of the other ways.

Cache control logic 134 in the embodiment shown is configured to perform various functions for L2 cache 13. These functions include reading data responsive to a cache hit, writing new data into the cache, evicting old data from the cache, searching the cache, updating tags and other information associated to cache entries (e.g., setting/resetting dirty bits), and forwarding copies of the tags and other information to duplicate tags memory 20. Cache control logic 134 is coupled to receive power from Vdd_CacheLogic via power switch S3. Accordingly, cache control logic 134 may be power gated when idle or when L2 cache 13.

During times of low system activity, L2 cache 13 may be placed in a retention mode. The retention mode may allow the retaining of the most recent data within the cache prior to placing other units (e.g., coherence circuit 16) into a sleep mode while also reducing power consumption. In one embodiment, the retention mode may be entered by removing power from cache control logic 134, while at the same time reducing the voltage provided to those ways 132 that remain powered on.

Duplicate tags memory 20 may be constructed similarly to L2 cache 13 with respect to power management. In particular, duplicate tags memory 20 may include a number of ways for storing duplicate tags, each of which corresponds to a unique one of the plurality of ways in L2 cache 13, and each of which may be separately and independently power managed. The power management of ways duplicate tags memory 20 may be performed by coherence circuit 16. In particular, coherence circuit 16 may power manage the ways of the duplicate tags memory 20 such that its power state mirrors that of L2 cache 13. That is, coherence circuit 16 may turn on ways in duplicate tags memory 20 that correspond to active ways in L2 cache 13, while removing power from ways that correspond to ways in L2 cache 13 that have also had their power removed. If the power state of L2 cache 13 changes (ways powered up or power down) while coherence circuit 16 is powered down, the subsequent changes to the power state of duplicate tags memory 20 may be performed upon coherence circuit 16 re-entering an active state.

It is noted that while the structure shown in FIG. 2 is applied to an L2 cache, the same or a similar structure may be applied to caches at other levels. Furthermore, L2 caches having a different structure than that shown here are possible and contemplated.

Figure 3:
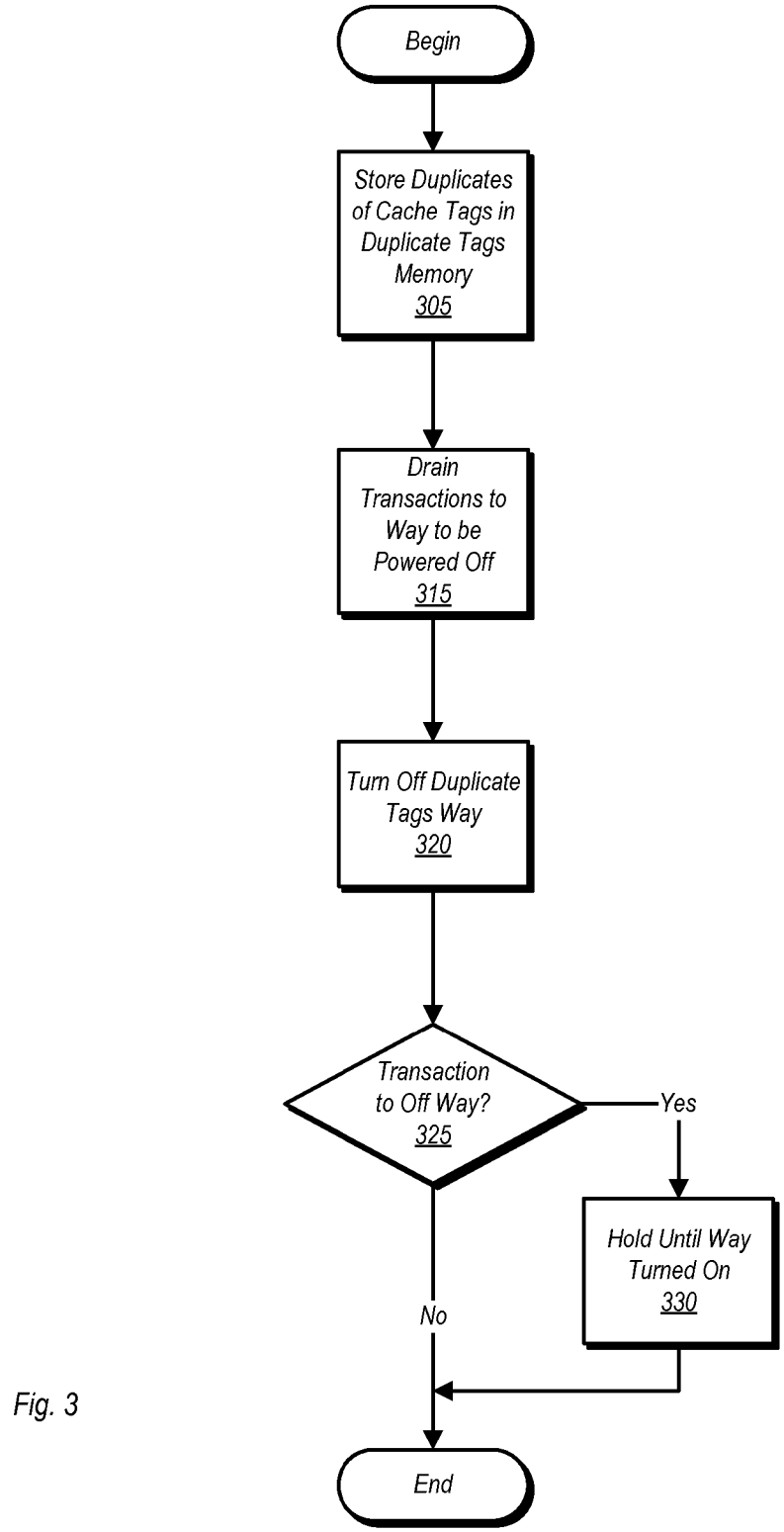
FIG. 3 is a flow diagram of one embodiment of a method for operating an IC having a coherence circuit.

FIG. 3 is a flow diagram of one embodiment of a method for operating an IC having a cache coherence circuit. It is noted that method 300 may be performed using various embodiment of IC 10 as discussed above. The performance of method 300 on hardware embodiments not explicitly discussed herein is also possible and contemplated.

Method 300 begins with the storing of duplicates of cache tags in a duplicate tags memory (block 305). The duplicate tags memory may have an organization that mirrors that of the cache memory for which the duplicate tags are being stored. The cache memory may include a number of way that may be separately and independently power controlled (i.e., powered on or powered of) with respect to other ones of the cache ways. Similarly, the duplicate tags memory may be organized such that portions (e.g., ways) corresponding to a particular way may be separately and independently power controlled relative to other portions of the duplicate tags memory.

Method 300 further includes draining transaction to ways that are to be powered down (block 315). This may include writing back data from the way or ways to be powered down to a lower level cache and/or memory, such that these locations lower in the memory hierarchy have the most recent copy of that data. Thereafter, the way or ways may be powered down, and the corresponding duplicate tags way may also be powered down (block 320). If a transaction is generated involving a powered down way (block 325, yes) then the transaction may be held until that way is turned on. Otherwise (block 325, no), method 300 is complete.

Figure 4:
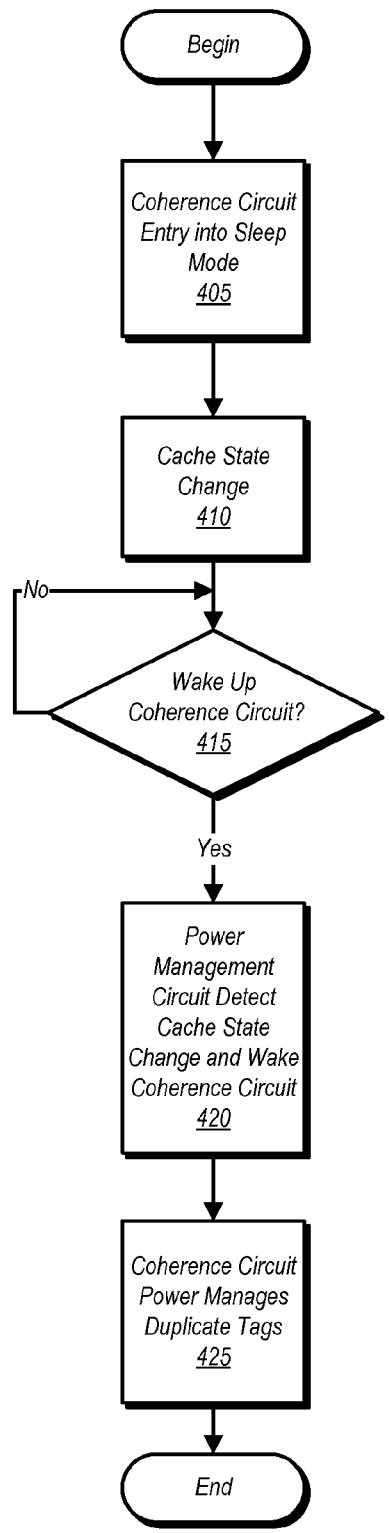
FIG. 4 is a flow diagram of another embodiment of a method for operating an IC having a coherence circuit.

FIG. 4 is a flow diagram of another embodiment of a method for operating an IC having a coherence circuit. As with method 300 discussed above, method 400 may be performed with various embodiments of the hardware discussed above, as well as with hardware embodiments not explicitly disclosed herein.

Method 400 begins with the coherence circuit being placed into a sleep mode (block 405). This may include clock-gating the coherence circuit, and may also include power-gating (i.e. removing power therefrom) the coherence circuit. Subsequent to the coherence circuit entering the sleep mode, a cache memory associated therewith may undergo a state change (block 410). The state change may include a change of the power status independently power managed ways within the cache memory. In particular, the state change may include powering down ways, powering up ways, or both.

The change of state may be indicated to a power management circuit. The power management circuit may determine if the coherence circuit is to be immediately awakened responsive to the cache state change. If the coherence circuit is not to be immediately awakened (block 415, no), then method 400 remains at this portion until a determination is made to wake up the coherence circuit (block 415, yes). Thereafter, the power management circuit may detect the state change and may respond thereto by waking up the coherence circuit (block 420). Subsequent to awakening, the coherence circuit may power manage the duplicate tags (block 425). This may include powering up portions of the duplicate tags memory that correspond to cache ways that were powered up and/or powering down portions of the duplicate tags memory that correspond to cache ways that were powered down.

Figure 5:
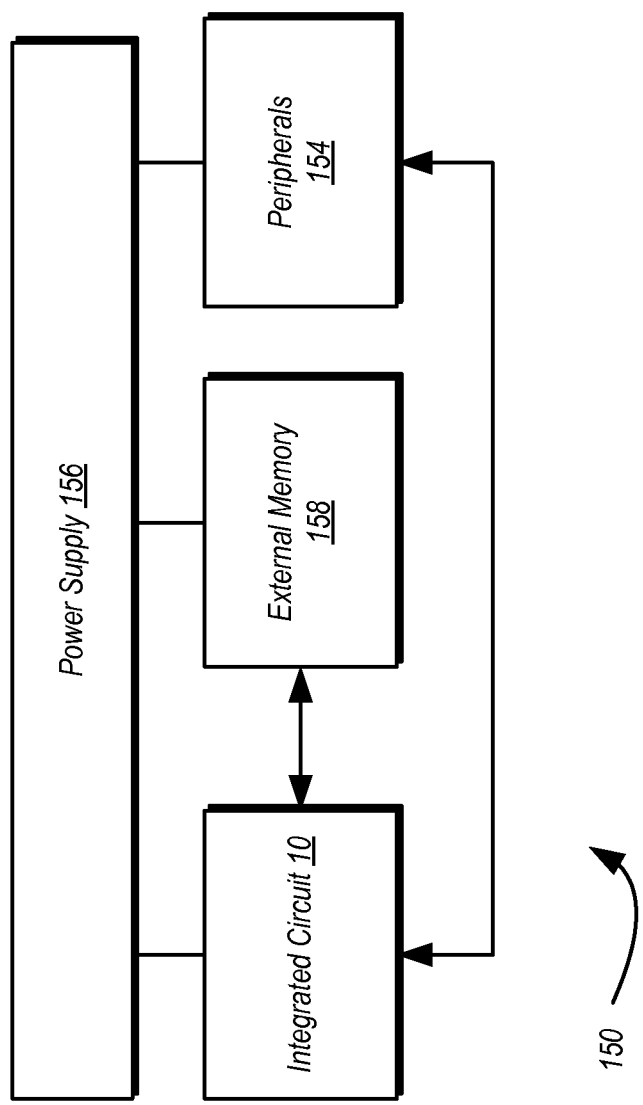
FIG. 5 is a block diagram of one embodiment of an exemplary system.

Turning next to FIG. 5, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a power management circuit;
   at least one cache memory having a plurality of ways that are separately and independently power managed;
   a duplicate tags memory configured to store duplicates of tags stored in the at least one cache memory; and
   a coherence circuit coupled to the cache via an interconnect network, wherein the coherence circuit is configured to maintain coherency of the at least one cache memory, wherein the coherence circuit is coupled to and separate from the duplicate tags memory, wherein:
   the cache memory is configured to indicate a power state of the plurality of ways to the power management circuit;
   the power management circuit is configured to transmit the power state to the coherence circuit;
   the coherence circuit is configured to power manage the duplicate tags memory to correspond to the power state; and
   during a time that the coherence circuit is powered down, the power management circuit is configured to detect a change in the power state of the cache memory and to wake the coherence circuit to power manage the duplicate tags memory.

2. The integrated circuit as recited in claim 1, wherein the power state comprises information indicative of which of the plurality of ways is powered up and which of the plurality of ways are not powered up.

3. The integrated circuit as recited in claim 1, wherein the coherence circuit is configured to invalidate duplicate tags corresponding to any of the plurality of ways that are not powered up.

4. The integrated circuit as recited in claim 1, wherein the coherence circuit is configured to power manage the duplicate tags memory by powering down portions of the duplicate tags memory that correspond to ways of the cache memory that are powered down, and to cause power to be provided to portions of the duplicate tags memory that correspond to ways of the cache memory that are powered up.

5. The integrated circuit as recited in claim 1, wherein the coherence circuit is configured to receive power from a first power bus and wherein the duplicate tags memory is configured to receive power from a second power bus that is separate from and independent of the first power bus.

6. The integrated circuit as recited in claim 1, wherein the at least one cache is configured to operate in a retention mode, wherein operation the retention mode comprises reducing a voltage supplied to each of the plurality of cache ways that remains powered on while retaining data stored therein.

7. The integrated circuit as recited in claim 1, further comprising a processor coupled to the coherence circuit via the interconnect network, and further coupled to the at least one cache memory via the interconnect network.

8. The integrated circuit as recited in claim 1, wherein the coherence circuit includes:
a queue configured to store information regarding pending transactions involving the at least one cache memory; and
a power manager configured to power manage the duplicate tags memory and further configured to generate power management requests to the power management circuit.

9. A method comprising:
a cache memory forwarding a plurality of tags to a coherence circuit;
writing, from the coherence circuit to a duplicate tags memory, each of the plurality of tags, each of the plurality of tags corresponding to entries in the cache memory;
providing, from the coherence circuit to a power management circuit, a request for entry into a sleep mode, the coherence circuit being coupled to the cache memory via an interconnection network and further coupled to and separate from the duplicate tags memory;
responsive to receiving the request, the power management circuit causing the coherence circuit to enter the sleep mode;
providing an indication of a change of power state of the cache memory from the cache memory to the power management circuit while the coherence circuit is in the sleep mode;
waking the coherence circuit from the sleep mode and providing the indication of the change of power state to the coherence circuit; and
power managing the duplicate tags memory, by the coherence circuit, according to the change of power state.

10. The method as recited in claim 9, wherein the cache memory includes a plurality of ways that are power controlled separately and independently from one another, and wherein the method further comprises the cache memory indicating the power state by providing information indicative of which of the plurality of ways are powered up and which of the plurality of ways are not powered up.

11. The method as recited in claim 10, wherein the method further comprises the coherence circuit invalidating duplicate tags corresponding to ones of the plurality of ways of the cache memory that are not powered up.

12. The method as recited in claim 10, further comprising the coherence circuit powering down portions of the duplicate tags that correspond to ones of the plurality of ways of the cache memory that are not powered up.

13. The method as recited in claim 9, further comprising providing power to the coherence circuit from a first power bus and providing power to the duplicate tags memory from a second power bus that is separate and independent from the first power bus.

14. The method as recited in claim 9, further comprising placing the cache memory in a retention mode in which at least a subset of a plurality of ways of the cache memory remains powered up at a reduced voltage.

15. The method as recited in claim 9, further comprising a queue in the coherence circuit storing information regarding pending transactions involving the cache memory.

16. The method as recited in claim 9, further comprising a power manager in the coherence circuit generating power management requests to be provided to the power management circuit.

17. A system comprising:
a cache memory having a plurality of independently power-controlled ways;
a duplicate tags memory configured to store duplicates of tags stored in the cache memory;
a coherence circuit coupled to the cache memory via an interconnection network, wherein the coherence circuit is further coupled to and separate from the duplicate tags memory; and
a power management circuit configured to place the coherence circuit into a sleep mode, wherein the power management circuit is configured to provide power state information indicative of a power state of the cache memory to the coherence circuit, and wherein responsive to detecting a change of the power state information, wake the coherence circuit from the sleep mode;
wherein upon being awakened from the sleep mode, the coherence circuit is configured to power manage the duplicate tags memory according to the change of the power state information.

18. The system as recited in claim 17, wherein the coherence circuit includes a queue configured to store information regarding pending transactions involving the cache memory, and wherein the coherence circuit is configured to update the duplicate tags stored in the duplicate tags memory in accordance with the pending transactions.

19. The system as recited in claim 17, wherein the power state information comprises information indicative of which of the plurality of ways of the cache memory are powered up and which of the plurality of ways are powered down, and wherein the coherence circuit is configured to invalidate duplicate tags corresponding to ones of the plurality of ways that are powered down and further configured to power down portions of the duplicate tags memory corresponding to ones of the plurality of ways that are powered down.

20. The system as recited in claim 17, wherein the coherence circuit is configured to receive power from a first power bus and wherein the duplicate tags memory is configured to receive power from a second power bus that is separate from and independent of the first power bus.

* * * * *